United States Patent
Cole et al.

(10) Patent No.: US 11,628,735 B2
(45) Date of Patent: Apr. 18, 2023

(54) ELECTRIC VEHICLE CHARGING USING LIGHT DETECTION

(71) Applicant: ABB Schweiz AG, Baden (CH)

(72) Inventors: Gregory A. Cole, West Hartford, CT (US); Sree Shankar, Bloomfield, CT (US); Daniel T. Lasko, East Granby, CT (US); Harshang Shah, Bloomfield, CT (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/568,501

(22) Filed: Jan. 4, 2022

(65) Prior Publication Data

US 2022/0126717 A1 Apr. 28, 2022

Related U.S. Application Data

(63) Continuation of application No. 16/578,965, filed on Sep. 23, 2019, now abandoned.

(51) Int. Cl.
*B60L 53/37* (2019.01)
*B60L 53/36* (2019.01)
*G01S 7/4865* (2020.01)
*G01S 17/04* (2020.01)
*B60L 53/53* (2019.01)

(52) U.S. Cl.
CPC ............... *B60L 53/37* (2019.02); *B60L 53/36* (2019.02); *G01S 7/4865* (2013.01); *G01S 17/04* (2020.01); *B60L 53/53* (2019.02)

(58) Field of Classification Search
CPC .......................... B60L 53/35–37; G02B 6/102
See application file for complete search history.

(56) References Cited

U.S. PATENT DOCUMENTS

2013/0338820 A1* 12/2013 Corbett .................. B60L 53/14
320/109
2017/0182899 A1* 6/2017 Hwang ................... B60L 53/16

* cited by examiner

*Primary Examiner* — David V Henze-Gongola
(74) *Attorney, Agent, or Firm* — Greenberg Traurig, LLP

(57) ABSTRACT

A charge head is connected to a charge inlet of an electric vehicle to supply an electric charge to recharge the battery of the vehicle. The charge head is attached to a connecting device that moves the charge head to the charge inlet. Multiple light detectors are provided on the charge head to sense light emitted from the vehicle. The system then uses a difference in the amount of light received by different light detectors to determine a direction to move the charge head toward the charge inlet.

19 Claims, 4 Drawing Sheets

ELECTRIC VEHICLE CHARGING USING LIGHT DETECTION

CROSS-REFERENCE TO RELATED APPLICATIONS

The present application is a continuation of U.S. patent application Ser. No. 16/578,965, filed on Sep. 23, 2019, and entitled "ELECTRIC VEHICLE CHARGING USING LIGHT DETECTION," the entirety of which is herein incorporated by reference.

BACKGROUND

The present inventions relate generally to electric vehicles, and more particularly, to moving a charge head of an electric power supply to a charge inlet of an electric vehicle.

Electric vehicles are growing in popularity. Unlike conventional combustion powered vehicles which are filled with a fluid fuel supply, electric vehicles must be connected to an electric supply to recharge an onboard battery. Since recharging of the battery must be done frequently (e.g., once a day), it would be desirable for the process of connecting the electric supply to the vehicle to be as easy and simple as possible. Therefore, the inventions are directed to improved systems for connecting an electric supply to an electric vehicle.

SUMMARY

An automatic connection method is described for connecting a charge head to the charge inlet of an electric vehicle to recharge the battery of the vehicle. The method uses light detectors to sense light emitted from the vehicle. Based on a difference in light sensed by at least two detectors, the charge head may be moved toward the charge inlet of the vehicle. The charge head may then make a connection with the charge inlet to provide an electric charge to the charge inlet to charge the vehicle. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
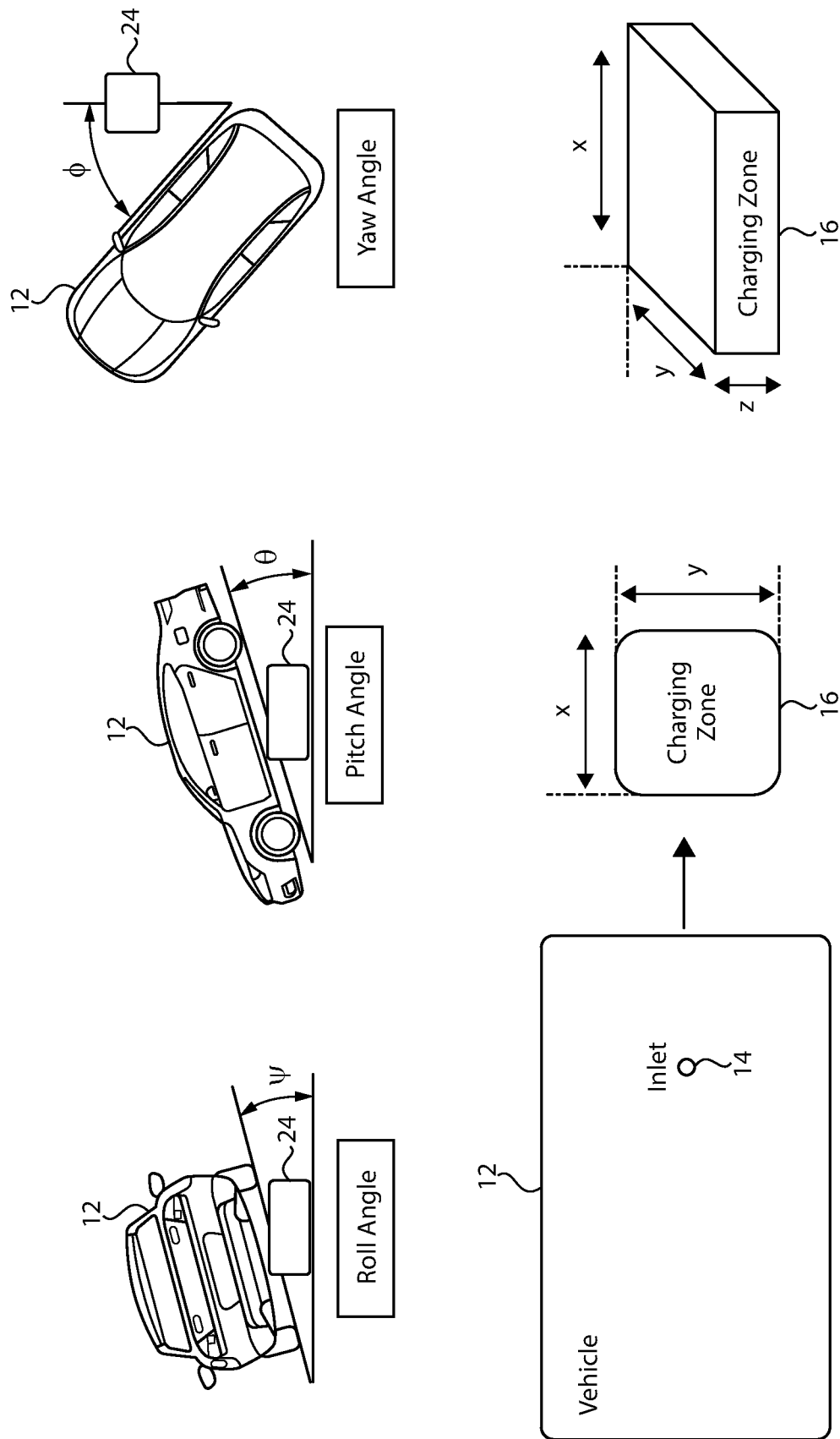
FIG. 1 is a schematic illustration of angles and positions of an electric vehicle relative to a charge zone.

Referring now to the figures, and particularly FIG. 1, the various angles and locations that may need to be considered when connecting an electric supply 10 to an electric vehicle 12 are shown. That is, when an electric vehicle 12 has been parked in a location intended for connecting the electric supply 10 to the vehicle 12, the angle and location of the vehicle 12 may vary in numerous ways that will change the location and orientation of the charge inlet 14 of the vehicle 12 relative to the automatic connection device 24. For example, FIG. 1 illustrates that the angle of the vehicle 12 may vary as shown by its roll angle .psi., pitch angle .theta., and yaw angle .PHI. Due to the parked position and type of vehicle 12, the location of the charge inlet 14 may also vary in a longitudinal direction x, lateral direction y, and vertical distance z. Thus, in an automatic connection system where the location of the vehicle 12 is uncontrolled, the location of the charge inlet 14 will be unknown to the automatic connection device 24. In order for the system to successfully connect automatically to the charge inlet 14 of the vehicle 12, the location of the charge inlet 14 must be determined within a narrow charging zone 16.

Figure 2:
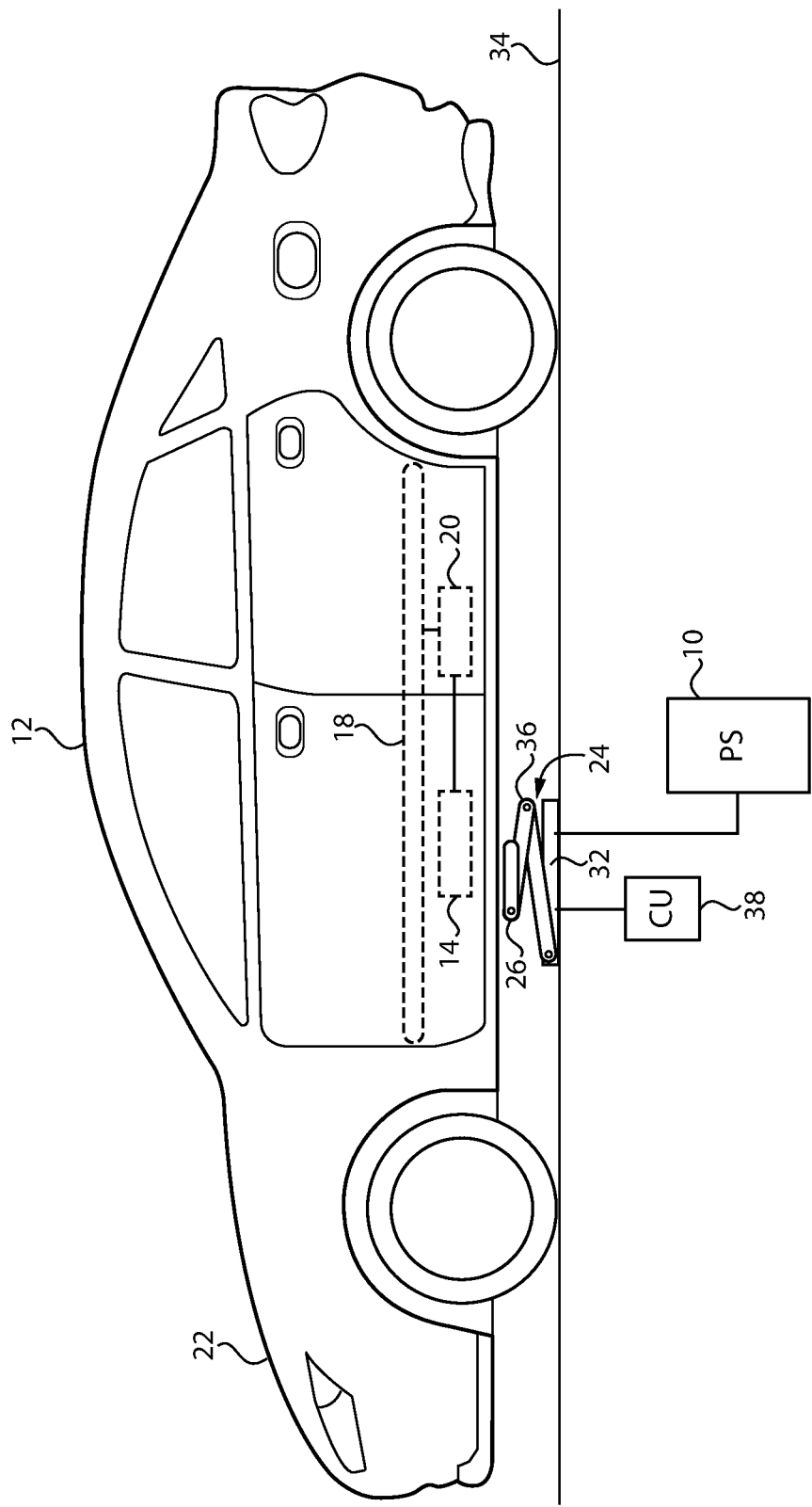
FIG. 2 is a schematic of an automatic connection system.

One embodiment of an automatic connection system is shown in FIG. 2. As is known, the electric vehicle 12 has a battery 18 that powers the vehicle 12 and requires periodic recharging. Typically, an onboard electric charger 20 is included on the vehicle 12 for charging the battery 18. The vehicle 12 also includes a charge inlet 14 for receiving an electric charge from an external power source 10. Although the charge inlet 14 may also be located on the side of the vehicle 12, in the preferred embodiment the charge inlet 14 is underneath the vehicle body 22.

Figure 3:
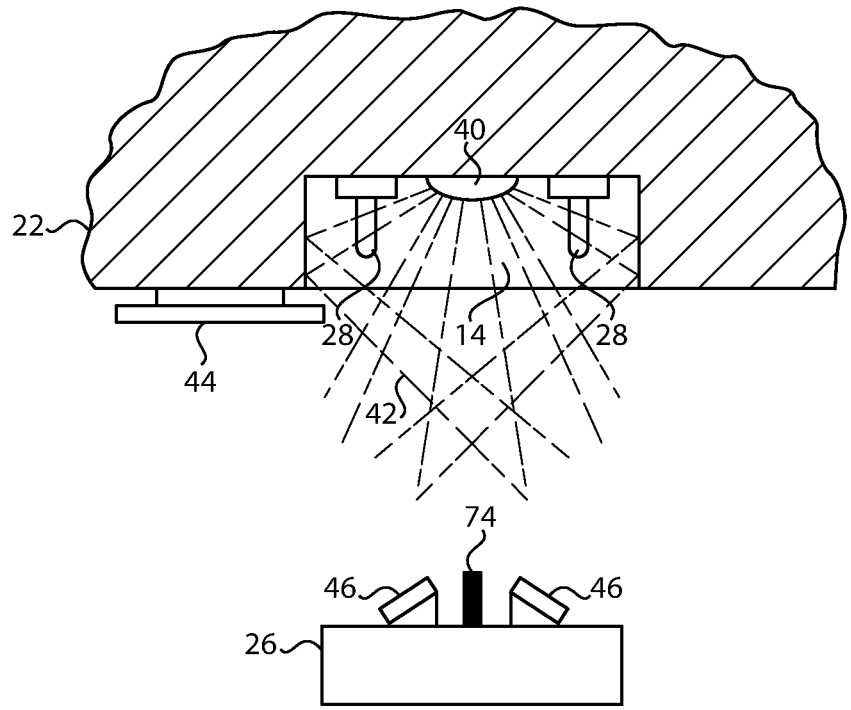
FIG. 3 is a schematic of a charge inlet and a charge head.
Figure 4:
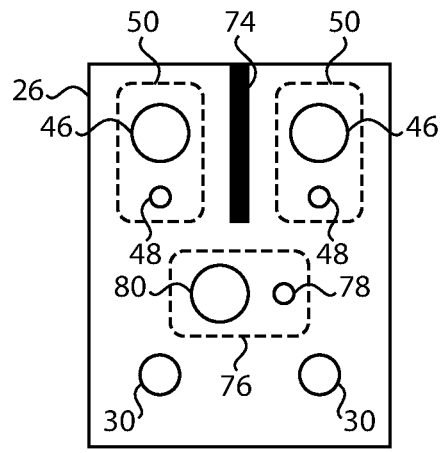
FIG. 4 is a schematic of the charge head.

The automatic connection system further includes a connection device 24 for connecting a charge head 26 to the charge inlet 14. Although the connection between the charge head 26 and the charge inlet 14 may be a non-contact connection (e.g., inductive), it is preferable for the connection between the charge head 26 and the charge inlet 14 to be a physical contact. For example, as shown in FIGS. 3-4, the charge inlet 14 or charge head 26 could have one or more conductive pins 28, and the other could have one or more corresponding conductive sockets 30 that engage with the pins 28. Thus, when physically contacting each other, an electric charge from an external power supply 10 flows through the charge head 26 and charge inlet 14 to supply a charge to the onboard charger 20 and battery 18 to recharge the vehicle 12.

The charge head 26 is preferably connected to a base 32 that rests on or is attached to the floor 34 or other non-movable structure. A powered linkage 36 is provided between the base 32 and the charge head 26 to allow the charge head 26 to move relative to the base 32 in order to connect the charge head 26 and the charge inlet 14 together. It is understood that the linkage 36 shown in the drawings is only illustrative, and many types of linkages 36 are possible. Preferably, the linkage 36 is able to move in the longitudinal direction x, lateral direction y, and vertical distance z. Such movement may involve the rotation and linear motion of linkage components in various directions. Movement of the linkage 36 and the charge head 26 is automatically controlled by a control unit 38.

In order to locate the charge inlet 14 and move the charge head 26 to the charge inlet 14 for electrical connection, the vehicle 12 may be provided with a light source 40 that emits light 42 from the vehicle 12. Preferably, the light source 40 is located at the charge inlet 14 to provide a direct guide for the charge head 26. Even more specifically, the charge inlet 14 may be an opening 14 within the electric vehicle 12 defined by an internal circumference and a depth. The light source 40 may then be located within the opening 14 in the depth thereof such that the light 42 is emitted out of the opening 14. As a result, the emitted light 42 is more narrowly directed by the surfaces of the opening 14 so that highly angled side rays of light 42 are reflected by the internal circumference of the opening 14. This provides a narrow beam of emitted light 42 from the opening 14 and also illuminates the internal surfaces of the opening 14, which is useful in the connection method described further below. Preferably, the light source 40 is outside of the visible spectrum (e.g., infrared) so that users of the charging system cannot see the emitted light 42 and are not disturbed by the light 42. Light 42 outside the visible spectrum may also prevent interference from other surrounding lights, such as garage lights. In order to protect the inside of the charge inlet 14 when no charging is occurring (e.g., when the vehicle 12 is being driven), it is preferable for a door 44 to be provided which covers the opening 14 during normal use of the vehicle 12 and is opened during the connection process to allow access to the electrical connections 28 therein and also to allow the light 42 to be emitted therefrom.

The charge head 26 may also be provided with two or more light detectors 46 for sensing the light 42 emitted from the vehicle 12. Preferably, each of the light detectors 46 is a component of a separate time of flight (ToF) sensor 50. Thus, as shown in FIG. 4, each light detector 46 may be paired with a corresponding light source 48, such as a laser 48, such that a pair of one of the light detectors 46 and one of the light sources 48 forms an individual ToF sensor 50. Preferably, the charge head 26 has at least two ToF sensors 50.

Figure 5:
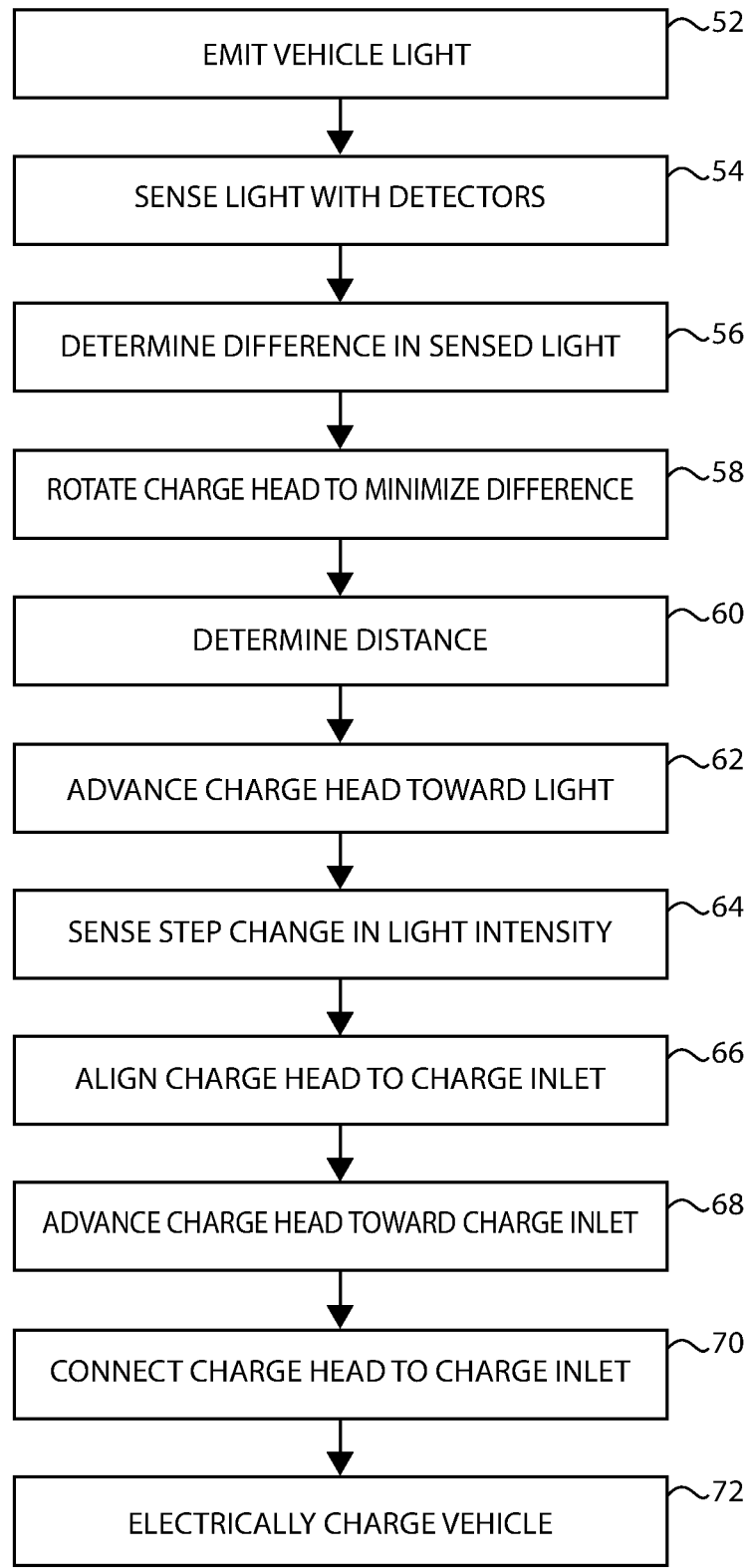
FIG. 5 is a flow chart of an automatic connection method.

Referring to FIG. 5, the light detectors 46 may be used to direct movement of the charge head 26 toward the charge inlet 14. For example, in a preferred connection method, the light 42 is emitted from the charge inlet opening 14 by the light source 40 (52). The detectors 46 then detect the amount of light 42 being received by each of the detectors 46 (54). The control unit 38 may then determine the amount of light 42 received by each detector 46 and the difference between the amount of light 42 being received by each detector 46 (56). As noted above, it may be preferable for each of the light detectors 46 to be part of a separate ToF sensor 50. ToF sensors 50 are desirable due to their relatively low cost and integrated light source 48 (i.e., laser 48) for distance measurements. However, the light detector 46 in a ToF sensor 50 is usually only used for distance measuring (i.e., receiving reflected light signals from the laser 48) or distance measuring calibration (i.e., monitoring ambient light conditions to fine tune distance measurements). However, in the preferred embodiments, the same light detector 46 in the ToF sensor 50, which is used in distance measuring, may also be used for directional guidance of the charge head 26 when used with another light detector 46 (e.g., a second ToF sensor 50).

The control unit 38 may then use the difference in light 42 sensed by the two detectors 46 to determine which way the charge head 26 should move in order to move toward the charge inlet 14. For example, when one of the detectors 46 is receiving more light 42 than the other detector 46 (i.e., the difference being above a threshold), the control unit 38 determines that the charge inlet 14 is in the direction of the detector 46 which is receiving more light. As a result, the control unit 38 may rotate the charge head 26 toward the charge inlet 14. Preferably, the control unit 38 continues to rotate the charge head 26 until the amount of light 42 being received by the two detectors 46 is similar to each other (e.g., below the threshold) (58). In this instance, the control unit 38 determines that the charge head 26 is facing the light 42 being emitted from the vehicle 12. As shown in FIGS. 3-4, the amount of light 42 sensed by the two detectors 46 differs from each other due to at least the spacing between the detectors 46. In order to further distinguish between light 42 being sensed by the two detectors 46, it may be desirable to provide a divider 74 between the light detectors 46 to block part of the light 42 being received by one of the detectors 46 from also being received by the other detector 46. As shown in FIG. 3, it may also be desirable to angle the two detectors 46 away from each other in order to further distinguish the amount of light 42 received by each detector 46.

Prior to further movement of the charge head 26, it may be desirable for the control unit 38 to determine the distance between the charge head 26 and the vehicle body 22, charge inlet 14 and/or light 42 (60). This may be done with one or more of the ToF sensors 50 by emitting light from the laser 48 in the ToF sensor 50 and then sensing the light with the integrated light detector 46 as it is reflected back. The time between emitting the light from the laser 48 and receiving it by the light detector 46 may then be used to determine a distance between the charge head 26 and the vehicle 12. In some arrangements, it may be desirable to provide a separate ultrasonic sensor 76 on the charge head 26 to determine distances between the charge head 26 and the vehicle 12. In a similar manner as the ToF sensor 50 described above, the ultrasonic sensor 76 has an ultrasonic transmitter 78 and an ultrasonic detector 80. In order to determine distances with the ultrasonic sensor 76, the ultrasonic transmitter 78 emits an ultrasonic signal. The ultrasonic detector 80 then senses the signal as it is reflected back by the vehicle 12. The time between emitting the ultrasonic signal and sensing the reflected signal may then be used to determine the distance to the vehicle 12. The use of an ultrasonic sensor 76 may be particularly useful when the initial distances are expected to be relatively far, since ultrasonic sensors 76 often have an effective range of 5 cm to several meters, whereas ToF sensors 50 often have a shorter effective range of 1-20 cm. By contrast, distance measurement accuracy of ToF sensors 50 (e.g., less than 1 mm) is notably better than ultrasonic sensors 76 (e.g., approximately 2 cm). Thus, it may be useful to obtain distance measurements initially with an ultrasonic sensor 76 and use one or more ToF sensors 50 as the charge head 26 is moved closer to the charge inlet 14. It is understood that more than two light detectors 46 (or ToF sensors 50) may be used on the charge head 26 to obtain greater accuracy in guiding the charge head 26 toward the light 42 and obtaining distance measurements. It should also be understood that distance measurements, detection of the vehicle light 42, and movement of the charge head 26 may be an iterative process involving numerous back-and-fourth steps between obtaining distance measurements, light 42 detection and movement of the charge head 26.

Once the charge head 26 has been oriented to face the emitted vehicle light 42 and the initial distance has been determined, the charge head 26 may be advanced in the direction of the light 42 (62). As the charge head 26 is moved closer to the charge inlet 14, one or both of the light detectors 46 will eventually sense a stepwise change in intensity of light 42 being sensed (64). That is, as opposed to FIG. 3 where the charge head 26 is shown directly underneath the charge inlet 14, the charge head 26 will usually begin the process off to one side of the charge inlet 14. Thus, the light detectors 46 will initially only sense the light 42 as it illuminates the space below the vehicle body 22 (i.e., when the charge inlet 14 is underneath the body 22). However, when the charge head 26 passes directly below (or across) the charge inlet 14, one or both of the light detectors 46 will begin to sense the light 42 directly from the light source 40 or from surfaces of the charge inlet 14 which are illuminated by the light source 40. Thus, the amount of received light 42 sensed by the detector(s) 46 will increase in a step change.

In response to the stepwise change in received light 42, the charge head 26 may be aligned with the charge inlet 14 by rotating the charge head 26 or by other movements using a similar routine of equalizing the difference in sensed light 42 as described above (66). In addition to equalizing the sensed light 42, or alternatively thereto, it may be preferable to use distance measurements determined by the ToF sensors 50 as described above to align the charge head 26 based on the step change in sensed light 42. This is particularly preferable due to the high accuracy of measurements that are possible with the ToF sensors 50. Thus, for example, by moving the charge head 26 back-and-fourth or rotating the charge head 26 relative to the charge inlet 14, the ToF sensors 50 may be used to identify the edges of the charge inlet opening 14 and the distance therefrom. The charge head 26 may then be advanced toward the charge inlet 14 (68). Once the charge head 26 reaches the charge inlet 14, the charge head 26 may be connected to the charge inlet 14 (70) to permit electric charge from the external power supply 10 to charge the battery 18 of the vehicle 12 (72).

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

What is claimed is:

1. A method of locating a charge inlet on an electric vehicle, comprising:
    sensing a first light with a first light detector and a second light detector, wherein the first light being emitted from the electrical vehicle;
    determining a difference between the first light sensed by the first light detector and the first light sensed by the second light detector; and
    moving a charge head toward the charge inlet based on the determined difference;
    wherein moving the charge head toward the charge inlet comprises rotating the charge head when the determined difference in the first light sensed between the first and second light detectors is above a threshold and comprises advancing the charge head in the direction of the first light when the determined difference in the first light sensed between the first and second light detectors is below the threshold.

2. The method according to claim 1, wherein the first and second light detectors are disposed on the charge head.

3. The method according to claim 1, wherein a divider is disposed between the first and second light detectors, the divider blocking at least a portion of the first light sensed by one of the first and second light detectors from being sensed by the other of the first and second light detectors.

4. The method according to claim 1, wherein the first and second light detectors are angled away from each other.

5. The method according to claim 1, wherein the first and second light detectors are spaced away from each other.

6. The method according to claim 1, wherein the first light is outside a visible spectrum.

7. The method according to claim 1, wherein the charge inlet comprises an opening with an internal circumference and a depth, a first source of the first light being disposed within the depth of the opening and emitting the first light out of the opening.

8. The method according to claim 7, wherein the charge inlet comprises a door covering the opening during normal use of the electric vehicle, the door being opened to allow the first light to be emitted from the opening.

9. The method according to claim 1, further comprising sensing a stepwise change in an intensity of the first light sensed by the first or second light detector, the stepwise change indicating surfaces of the charge inlet illuminated by the first light or a first source of the first light, the charge head being aligned with the charge inlet based on the stepwise change.

10. The method according to claim 1, further comprising a second source of a second light disposed on the charge head, the second source emitting the second light toward the electric vehicle, the first light detector sensing the second light after the second light reflects back from the electric vehicle, and further comprising determining a distance between the charge head and the electric vehicle based on an amount of time between emitting the second light from the second source and sensing the second light by the first light detector, and wherein the charge head is moved toward the charge inlet based on the determined distance.

11. A method of locating a charge inlet on an electric vehicle, comprising:
    sensing a first light with a first light detector and a second light detector, wherein the first light being emitted from the electrical vehicle;
    determining a difference between the first light sensed by the first light detector and the first light sensed by the second light detector;
    moving a charge head toward the charge inlet based on the determined difference; and
    a second source of a second light disposed on the charge head, the second source emitting the second light toward the electric vehicle, the first light detector sensing the second light after the second light reflects back from the electric vehicle, and further comprising determining a distance between the charge head and the electric vehicle based on an amount of time between emitting the second light from the second source and sensing the second light by the first light detector, and wherein the charge head is moved toward the charge inlet based on the determined distance.

12. The method according to claim 11, wherein the second source of the second light and the first light detector are integrated in a time of flight sensor (ToF).

13. The method according to claim 11, wherein the first and second light detectors are disposed on the charge head, and the charge inlet comprising an opening with an internal circumference and a depth, a first source of the first light being disposed within the depth of the opening and emitting the first light out of the opening.

14. The method according to claim 13, wherein the charge inlet comprises a door covering the opening during normal use of the electric vehicle, the door being opened to allow the first light to be emitted from the opening.

15. The method according to claim 14, wherein moving the charge head toward the charge inlet comprises rotating the charge head when the determined difference in the first light sensed between the first and second light detectors is above a threshold and comprises advancing the charge head in the direction of the first light when the determined difference in the first light sensed between the first and second light detectors is below the threshold, and the second source of the second light and the first light detector are integrated in a time of flight sensor (ToF).

16. The method according to claim 15, wherein a divider is disposed between the first and second light detectors, the divider blocking at least a portion of the first light sensed by one of the first and second light detectors from being sensed by the other of the first and second light detectors.

17. The method according to claim 16, wherein the first and second light detectors are angled away from each other, and the first light is outside a visible spectrum.

18. A method of locating a charge inlet on an electric vehicle, comprising:

sensing a first light with a first light detector and a second light detector, wherein the first light being emitted from the electrical vehicle;

determining a difference between the first light sensed by the first light detector and the first light sensed by the second light detector;

moving a charge head toward the charge inlet based on the determined difference;

sensing a stepwise change in an intensity of the first light sensed by the first or second light detector, the stepwise change indicating surfaces of the charge inlet illuminated by the first light or a first source of the first light, the charge head being aligned with the charge inlet based on the stepwise change; and wherein in response to the stepwise change a second source emits a second light toward the electric vehicle, the first light detector sensing the second light after the second light reflects back from the electric vehicle, and further comprising determining a distance between the charge head and the electric vehicle based on an amount of time between emitting the second light from the second source and sensing the second light by the first light detector, and wherein the charge head is aligned with the charge inlet based on the determined distance.

19. A method of locating a charge inlet on an electric vehicle, comprising:

sensing a first light with a first light detector and a second light detector, wherein the first light being emitted from the electrical vehicle;

determining a difference between the first light sensed by the first light detector and the first light sensed by the second light detector; and moving a charge head toward the charge inlet based on the determined difference;

wherein the charge head comprises an ultrasonic transmitter and an ultrasonic detector, the ultrasonic transmitter emitting an ultrasonic signal toward the electric vehicle, the ultrasonic detector sensing the ultrasonic signal after the ultrasonic signal reflects back from the electric vehicle, further comprising determining a distance between the charge head and the electric vehicle based on an amount of time between emitting the ultrasonic signal from the ultrasonic transmitter and sensing the ultrasonic signal by the ultrasonic detector, and wherein the charge head is moved toward the charge inlet based on the determined distance.

* * * * *